US008516085B2

(12) United States Patent  (10) Patent No.: US 8,516,085 B2
Stolyar  (45) Date of Patent: Aug. 20, 2013

(54) SYSTEMS AND METHODS FOR ALLOCATING RESOURCES BY A NETWORK DEVICE

(75) Inventor: Aleksandr Stolyar, Basking Ridge, NJ (US)

(73) Assignee: Alcatel Lucent, Paris (FR)

(*) Notice: Subject to any disclaimer, the term of this patent is extended or adjusted under 35 U.S.C. 154(b) by 2799 days.

(21) Appl. No.: 11/073,513

(22) Filed: Mar. 7, 2005

(65) Prior Publication Data

US 2006/0203768 A1 Sep. 14, 2006

(51) Int. Cl.
*G06F 15/177* (2006.01)

(52) U.S. Cl.
USPC .............. 709/220; 709/223; 709/228

(58) Field of Classification Search
None
See application file for complete search history.

(56) References Cited

U.S. PATENT DOCUMENTS

| | | | |
|---|---|---|---|
| 6,374,117 B1 * | 4/2002 | Denkert et al. | 455/522 |
| 7,272,732 B2 * | 9/2007 | Farkas et al. | 713/320 |
| 2003/0226046 A1 * | 12/2003 | John | 713/300 |

OTHER PUBLICATIONS

Stoylar, Alexander L., Maxweight Scheduling in a Generalized Switch: State Space Collapse and Workload Minimization in Heavy Traffic, The Annals of Applied Probalibity, 2004, pp. 1-53, vol. 14, No. 1, Publisher: Institute of Mathematical Statistics.
Tse, David N.C. and Hanly, Stephen V., Multiaccess Fading Channels—Part I: Polymatroid Structure, Optimal Resource Allocation and Throughput Capacities, IEEE Transactions on Information Theory, Nov. 1998, pp. 2796-2815, vol. 44, No. 7.
Yeh, Edmund and Aaron S. Cohen, Maximum Throughput and Minimum Delay in Fading Multiaccess Communications, Proceedings of IEEE INFOCOM 2004.

* cited by examiner

*Primary Examiner* — Jeffrey R Swearingen
(74) *Attorney, Agent, or Firm* — The Law Offices of Peter H. Priest

(57) ABSTRACT

Systems and techniques to set a new service rate for one or more queues of a router and a new power consumption level for a router is disclosed. The queues are configured to store data packets awaiting transmission from the router. The setting of the new service rate or rates and new power level is based on a service rate of the one or more queues and a power consumption level of the router. The techniques disclosed further include resetting a new service rate for the one or more queues of the router and a new power consumption level of the router. The resetting of the new service rate or rates and new power level is based on a service rate of the one or more queues and a power consumption level of the router. The setting and resetting steps are based differently on the power consumption level of the router.

6 Claims, 6 Drawing Sheets

SYSTEMS AND METHODS FOR ALLOCATING RESOURCES BY A NETWORK DEVICE

FIELD OF THE INVENTION

The present invention relates generally to systems, methods, and computer readable media for allocating resources for a network device.

BACKGROUND OF THE INVENTION

In today's communication networks, dynamic allocation of service resources is an important and difficult task. Such service resources may include traffic generation rates, service or processing rates utilized to process incoming traffic, power usage, or the like for a network device. Effective management of such service resources requires network providers to attempt to satisfy the varying requirements of wide variety of communication consumers or customers. Conventional techniques to dynamic allocation of service resources typically require a priori statistical information or a significant amount of a priori calculations with complex and time consuming calculations taking place at network devices. Some conventional techniques may lead to unbounded queue lengths, resulting in unstable network devices.

SUMMARY OF THE INVENTION

Among its several aspects, the present invention recognizes a need for improved systems and techniques for dynamic allocation of service resources for a network device that assures acceptable performance while maintaining a stable communication network.

To such ends, in one exemplary embodiment, a method for setting a new service rate for one or more queues of a router and a new power consumption level for a router. The queues are configured to store data packets awaiting transmission from the router. The setting of the new service rate or rates and new power level is based on a service rate of the one or more queues and a power consumption level of the router. The method further includes resetting a new service rate for the one or more queues of the router and a new power consumption level of the router. The resetting of the new service rate or rates and new power level is based on a service rate of the one or more queues and a power consumption level of the router. The setting and resetting steps are based differently on the power consumption level of the router.

In another exemplary embodiment, another method for setting service rates and power consumption is disclosed. This method includes setting a new service rate for each queue of a router and a new power consumption level for the router. Each queue is configured to store data packets awaiting transmission from the router. The step of setting is based on comparing values of an expression. The expression is a sum of terms, one of the terms being a product of a non-decreasing function of a length of one of the queues times a service rate of the one of the queues, another term being a derivative of a decreasing function of an average power consumption in the router times an instantaneous power usage level in the router.

In a further exemplary embodiment, a computer readable medium is provided for causing a computer system to generate one or more traffic generation rates of data packets. The computer system has program code for performing the steps of determining a neighboring node as a target of data packets generated by the computer system where the neighboring node has a queue for receiving the data packets, obtaining the current length of the queue, and selecting a vector of one or more communication traffic generation rates of data packets from a discrete set of available choices of traffic generation rates. The selecting step may suitably include utilizing the current length of the queue and the effect of the selection of the vector of one or more communication traffic generation rates would have on the queue.

The aforementioned exemplary embodiments summarized above have several advantages. These techniques are frugal in that the vector selection is from a set of available choices based on minimal amount of information. In these techniques, a router advantageously makes decisions independently of other routers such that benefits are bestowed individually on the router and on the communications network, when all routers are modified in accordance with the present invention. Furthermore, in these techniques, a configured utility function at a router may be concave or linear. The maximized expressions consider finite queue lengths of the network and power consumption at a router. These techniques do not require a priori statistical information and the determinations made are relatively easy.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as methods, systems, or computer readable media. Accordingly, the present invention may take the form of a hardware embodiment, a software embodiment or an embodiment combining software and hardware aspects such as firmware. Furthermore, the present invention may take the form of a computer program on a computer-usable storage medium having computer-usable program code embodied in the medium. Any suitable computer readable medium may be utilized including hard disks, CD-ROMs, optical storage devices, flash memories, magnetic storage devices, or the like.

Computer program code or "code" for carrying out operations according to the present invention may be written in an object oriented programming language such as JAVA®, Smalltalk, JavaScript®, Visual Basic®, TSQL, Perl, C, C++ or in various other programming languages. Software embodiments of the present invention do not depend on implementation with a particular programming language. Portions of the code may execute entirely on one or more systems utilized by a network node or a base station.

Figure 1:
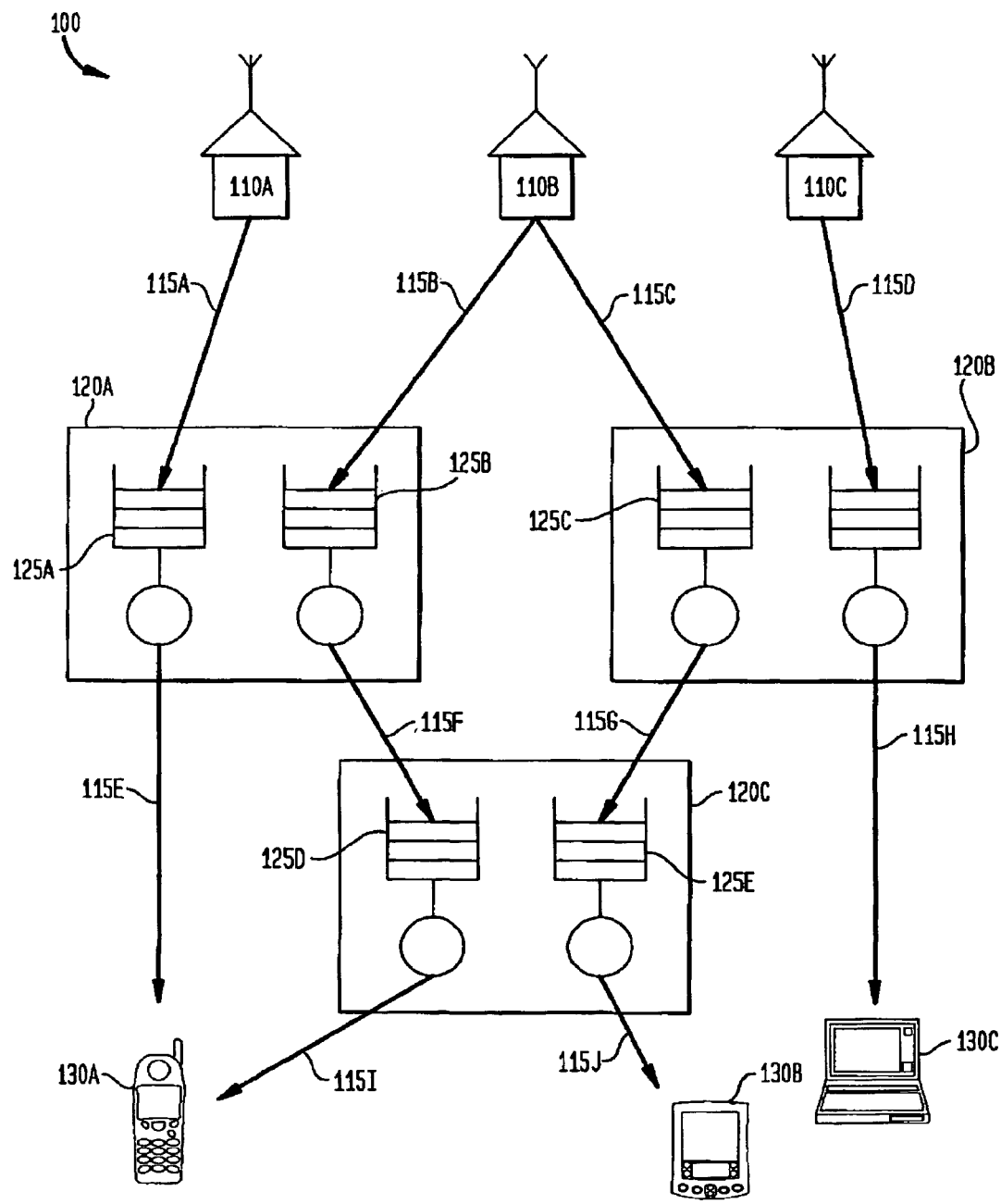
FIG. 1 illustrates an exemplary network environment in which a first embodiment of the present invention may be advantageously employed.

The code may execute partly on a network node and partly on another network node or base station in communication with the network node over a communications network. Regarding the former scenario, FIG. 1 is an illustration of an exemplary system 100 in which the present invention may be advantageously employed. The system 100 includes base stations 110A-110C, intermediary nodes 120A-120C, and end devices 130A-130C. Base stations 110A-110C are coupled to intermediate nodes 120A and 120B through communication channels 115A-115D. Intermediate nodes 120A and 120B are coupled to end device 130A, intermediate node 120C, and end device 130C over communication channels 115E-115H, respectively. Intermediate node 120C is coupled to end devices 130A and 130B over communication channels 115I and 115J, respectively.

Base stations 110A-110C, intermediary nodes 120A-120C, and end devices 130A-130C are computer based devices which at least contain a central processing unit (CPU), memory, and are able to execute computer program code according to the teachings of the present invention. Base stations 110A-110C, intermediary nodes 120A-120C, and end devices 130A-130C may be connected through a wireless or wired connection. Base stations 110A-110C are considered sources of traffic or traffic generators. An intermediate node may also be referred to as a router. Intermediate nodes receive packets of data and forward those packets of data to a neighboring node. Intermediary nodes 120A-120C contain queues for buffering and processing incoming packets. For example, intermediate node 120A has queue 125A for receiving packet data of a particular traffic flow from base station 110A and queue 125B for receiving packet data of another traffic flow from base station 110B. It should be noted that in this exemplary embodiment a queue is used on a per traffic flow basis.

Each intermediate node has a corresponding set of available service rate vectors with different vector components corresponding to different queues in the node from which a particular service rate vector is selectable. How the intermediate node selects service rate vectors to apply within a timeslot will be discussed in further detail below. A queue may be implemented as a buffer in memory where packets await processing by a CPU. Furthermore, a single buffer may be partitioned in various manners to represent multiple queues. End nodes are final consumers of information in that the packets of data reach their final destination at an end node. During a typical timeslot or timeslots in the operation of the system 100 illustrated in FIG. 1, packets are generated from base stations 110A-110C, packets are received by intermediate nodes 120A-120C and forwarded on, and packets are received and consumed by end nodes 130A-130C.

Although various end nodes are illustratively depicted as a cell phone, a handheld device and a notebook computer in FIG. 1, end nodes may also include workstations, servers, or other devices having a CPU, memory, and facilities to receive information over a network, or the like. It should be noted that an end node during one timeslot may take on the role of an intermediate node or a traffic generator in another timeslot. Although not shown, each end node contains at least one processing queue for receiving packet data from an intermediate node and may contain multiple queues when forwarding packets. It should be noted that a system according to the teachings of the present invention may include any number of base stations, intermediary nodes, and end devices. Also, it should be noted that the network depicted in FIG. 1 may be a wired or wireless ad hoc network, a multi-hop network, a sensor network, or the like. Although the arrows indicate the flow of data packets in a downward direction from base stations to end nodes for this example, it should be noted that the teachings of the present invention are applicable to the handling of data packets flowing in any direction. In the case of upward flowing packets, for example, end nodes are treated as generation sources and may contain the same selection control according to the teachings of the present invention as base stations. The selection control will be described in further detail below.

For every timeslot, a typical base station will have available to it a discrete set of available generation rates from which to choose for transmitting data to an intermediate node. For example, if a data file is being transferred from a base station to an end node, the base station will select on a timeslot basis one or more generation rates for transmitting the data file packets. If base station 110A was transmitting as shown in FIG. 1, it would select one rate, $\lambda_1$, out of a set of available rates at which to transmit the data file. If the base station 110B was transmitting as shown in FIG. 1, it would select a vector of two rates, $(\lambda_2, \lambda_3)$, to transmit packets to intermediate nodes 120A and 120B, respectively. If the base station 110C was transmitting, it would select one rate, $\lambda_4$, out of a set of available rates at which to transmit the data file. Packets will typically be sent to the neighboring intermediate nodes 120A and 120B at rates determined so as to achieve a network objective or objectives expressed via the utility functions assigned to end-to-end traffic flows. The utility function of a traffic flow is known to the corresponding base station generating that flow. The term traffic flow as used herein describes the flow of data packets in a communication network. This network objective is written as $$\text{maximize} \sum_i U_i(X_i), \tag{1}$$

where for each traffic flow i in the communication network, $X_i$ is the long term average traffic generation rate $\lambda_i(t)$, and $U_i(x)$ is some concave or linear function assigned to traffic flow i. Exemplary concave or linear functions used as utility functions in a communication network include $U_i(x)=a_1 \log x,$ $U_i(x)=a_1 \log (x+a_2)$ $U_i(x)=a_1 x+a_2,$ and the like.

where $a_1$ and $a_2$ are constants and x is a generic variable. These and other concave and linear functions may be set by a system designer or network operator to achieve a certain network objective such as satisfying customer class of service requirements. Furthermore, different utility functions known to base stations may be configured across traffic flows to promote different objectives for each particular traffic flow generated by a base station. One objective accomplished by a utility function may be to promote fairness such as $$\sum_i \log x_i,$$

while another objective may promote maximal raw throughput the network, such as $$\sum_i x_i.$$

In order to achieve a stable network, the teachings of the present invention impose the constraint that queues in the network have a finite length. Thus, the general selection rule for traffic generation rate, $\lambda_n$, can be written as $$\text{maximize} \sum_n [U'_n(X_n(t))\lambda_n - \beta Q_p(t)\lambda_n] \quad (2)$$

where n indicates each traffic flow generated by a base station which can simultaneously transmit in a timeslot, $U_n'$ is a derivative with respect to x of the configured utility function for generating traffic flow, $X_n(t)$ is the average traffic generation rate estimate for flow at time t, $\beta$ is a fixed small constant greater than zero, p indicates the target queue in a neighboring intermediate node, if any, to which the traffic flow is forwarded by the base station, and $Q_p(t)$ is the queue length of queue p. For example, when n=1, the utility function is associated with generating a traffic flow over channel 115A to intermediate node 120A is determined. When n=2, the utility function associated with generating traffic flow over channel 115B is determined. It should be noted that the term target as used herein refers to a neighboring intermediate node to which the node under consideration forwards the traffic flow. This term does not suggest that the target whether it is a queue or an intermediate node is the final destination of the generated traffic flow.

Utilizing expression (2) for a base station to select a vector of values of $\lambda_n$ enables the base station to make decisions based on the queue lengths of neighboring nodes without having to consider other nodes in the network even if those other nodes in the network are necessary to deliver the packets to an end node. Furthermore, a base station utilizing this strategy to generate traffic rates is discouraged from sending traffic to large queues in neighboring nodes.

Referring to FIG. 1, base station 110B is preferably configured to maximize its selection of the vector of traffic generation rates, $(\lambda_2,\lambda_3)$, for channels 115B and 115C by maximizing the following expression:

$$U_2'(X_2(t))\lambda_2 + U_3'(X_3(t))\lambda_3 - \beta Q_2(t)\lambda_2 - \beta Q_3(t)\lambda_3 \quad (3)$$

where $U_2'$ is the derivative of the configured utility function for generating traffic flow 2 from base station 110B to intermediate node 120A, $X_2(t)$ is the estimation of average traffic rate of flow 2 up to time t, $U_3'$ is a derivative of the configured utility function for generating traffic flow 3 from base station 110B, $Q_2(t)$ is the queue length at time t of queue 125B, and $Q_3(t)$ is the queue length at time t of queue 125C. There are many known ways for base station 110B to find out the queue lengths of its neighboring nodes. However, one way for determining such queue lengths is for the intermediate nodes to provide the queue length in an acknowledgement to a base station during normal protocol communication.

With regard to expression (3), it should be noted that the constant $\beta$ may be factored from the terms above and other constants $c_2$ and $c_3$ may be added to precede the fourth and fifth terms. In so doing, a control is added which effects the decision of selecting vector $(\lambda_2,\lambda_3)$ on queue length without significantly affecting the network objective, expression (1). For example, if $c_2=2$, then the average queue length of queue 125B would be approximately halved. In short, the resulting average queue length is inversely proportional to the value of the constant.

After base station 110B chooses the combination or vector of traffic generation rates $(\lambda_2, \lambda_3)$ for the current timeslot, the base station 110B updates the estimation of average traffic generation rates, $X_2(t)$ and $X_3(t)$, for the next timeslot by using the following equation:

$$X_i(t+1) = \beta \lambda_i(t) + (1-\beta) X_i(t) \quad (4)$$

where i, in base station 110B's case, is 2 for one path and 3 for the other. This simple, self-contained calculation for updating the estimation of average traffic generation rates does not require information to be communicated to a base station from other nodes.

Intermediate nodes 120A-120C may be configured to make a selection of a vector of service rates in order to stabilize queue lengths throughout the system. An intermediate node would consider maximizing the processing of queued traffic while minimizing the effects of its processed traffic on a neighboring node which receives traffic from the intermediate node. The expression, in general, for an intermediate node to select service rates $\mu_i$ can be written as follows:

$$\text{maximize} \sum_i [Q_i(t)\mu_i - Q_n(t)\mu_i] \quad (5)$$

where i indicates each queue in the intermediate node, $Q_i(t)$ is the queue length of a queue within the intermediate node, $\mu_i$ is the service rate associated with the $i^{th}$ queue, n indicates each target queue in a neighboring intermediate node, if any, and $Q_n(t)$ is the queue length of the target queue n in the neighboring intermediate node to which queue i forwards packets. $Q_n(t)$ is equal zero if there is no such intermediate node. For example, intermediate node 120A selects a vector of service rates $(\mu_{125A}, \mu_{125B})$ which maximizes the specific expression as follows:

$$Q_{125A}(t)\mu_{125A} + Q_{125B}(t)\mu_{125B} - Q_{125D}(t)\mu_{125A} \quad (6)$$

where $Q_{125A}(t)$ is the queue length and $\mu_{125A}$ is the service rate of queue 125A, $Q_{125B}(t)$ is the queue length and $\mu_{125B}$ is the service rate of queue 125B, and $Q_{125D}(t)$ is the queue length of queue 125D and $\mu_{125A}$ is the service rate of queue 125A. For intermediate node 120C, intermediate node 120C is configured to select a vector of service rates $(\mu_{125D}, \mu_{125E})$ which maximizes the specific expression as follows:

$$Q_{125D}(t)\mu_{125D} + Q_{125E}(t)\mu_{125E} \quad (7)$$

where $Q_{125D}(t)$ is the queue length and $\mu_{125D}$ is the service rate of queue 125D and $Q_{125E}(t)$ is the queue length and $\mu_{125E}$ is the service rate of queue 125E. It should be noted that expression (7) does not contain terms with negative signs because intermediate node 120C does not forward traffic to another intermediate node. In general, expression (5) for a particular intermediate node will not include terms with negative signs if the targets of the particular intermediate node are end nodes.

Figure 2:
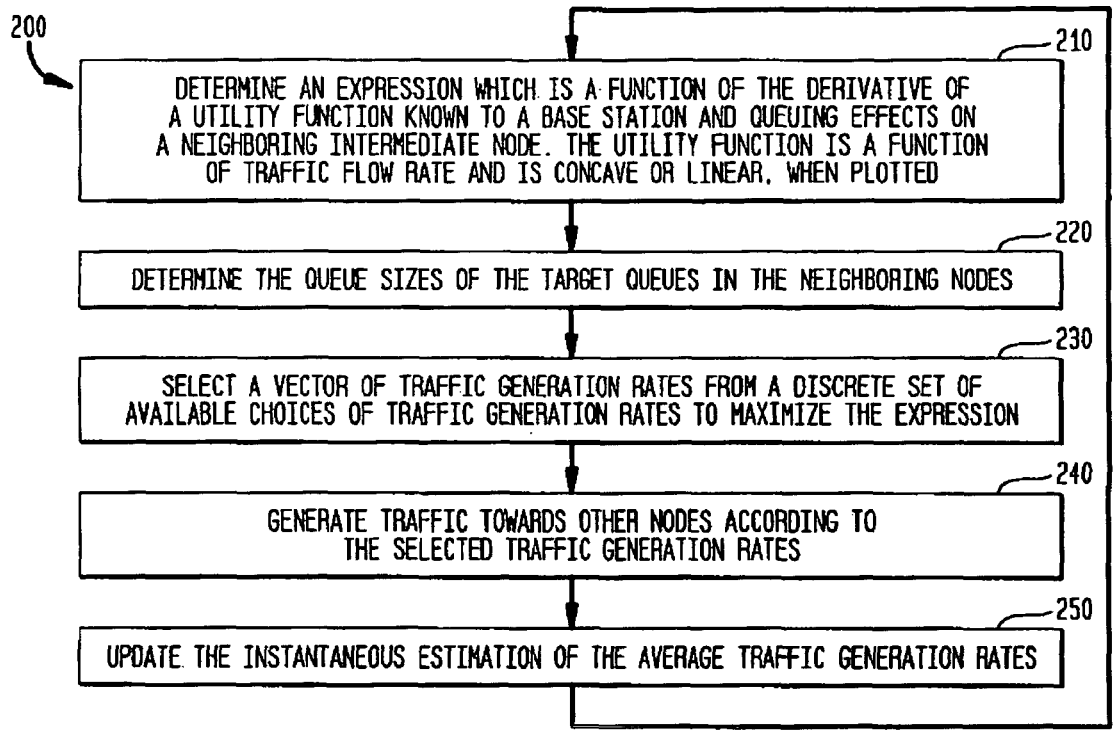
FIG. 2 is a flow chart illustrating a method of traffic generation selection at a base station in accordance with the present invention.

FIG. 2 is a flow chart 200 illustrating a method of traffic generation selection at a base station in accordance with the present invention. The method is typically performed on a timeslot by timeslot basis. Typically, a timeslot is on the order of 1 millisecond. At step 210, the method determines an expression known to the base station. The expression is a function of derivatives of utility functions of traffic flows generated by the base station and the queuing effects on neighboring intermediate nodes. At step 220, the method determines the queue lengths of neighboring intermediate node or nodes which will be targets of generated traffic flows. At step 230, the method selects a vector of traffic generation rates from a discrete set of available choices of traffic generation rates to maximize the expression. As mentioned above, it should be emphasized that a base station selects a vector of transmission rates and that the selected vector of transmission rates maximize expression (2) above.

For example, base station 110B may have a set of available traffic generations rate pairs such as {(rate$_1$, rate$_4$), (rate$_2$, rate$_5$), (rate$_3$, rate$_6$)}. These rate pairs reflect the pair of available choices for ($\lambda_2$, $\lambda_3$). In a timeslot, base station 110B would select the vector of values for ($\lambda_2$, $\lambda_3$) from these rate pairs which maximize expression (2) and more specifically expression (3). If the base station generates one traffic flow as base station 110A, for example, a value for $\lambda_1$ will be selected to maximize expression (2). Furthermore, it should be noted that the specific expression for base station 110A, expression (2), may vary depending on what intermediate nodes and what queues within those intermediate nodes are targets of base station 110A generated traffic flow. At step 240, the method generates traffic flow towards neighboring nodes according to the selected traffic generation rates. At step 250, the method performs a bookkeeping function by updating the estimation of the average traffic generation rates.

Figure 3:
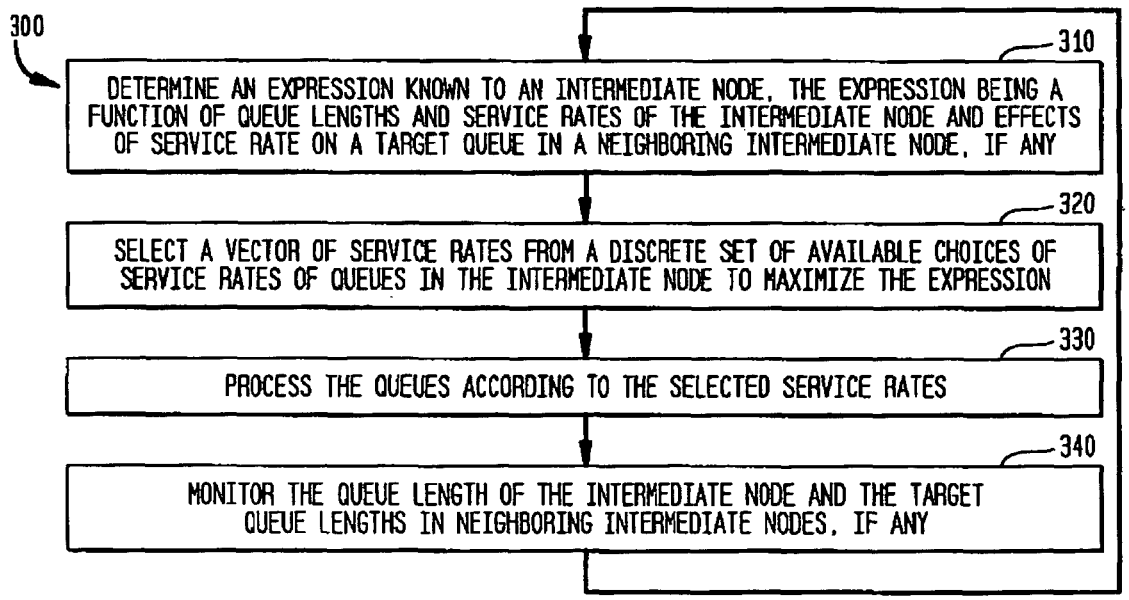
FIG. 3 is a flow chart illustrating a method of service rate selection at an intermediate network node in accordance with the present invention.

FIG. 3 is a flow chart 300 illustrating a method of service rate selection at an intermediate network node to ensure the network objective expressed in expression (1). The method is typically performed on a timeslot by timeslot basis. At step 310, the method determines an expression known to an intermediate node. The expression is a function of a service rate and queue lengths of the intermediate node and the queuing effects of service rate on a target queue in a neighboring node, if any. At step 320, the method selects a vector of service rates from a set of discrete available choices of service rates of queues in an intermediate node to maximize the expression. Thus, the selected vector of service rates maximizes expression (5) above for the intermediate node. More specifically, intermediate node 120A, for example, selects the service rate vector ($\mu_{125A}$, $\mu_{125B}$) which maximizes expression (6). Furthermore, it should be noted that the specific maximizing expression for intermediate node 120A, expression (6), may vary depending on what target queues in a neighboring intermediate node receive the traffic flow from intermediate node 120A. At step 330, the method processes the queues of the intermediate node according to the selected service rates. At step 340, the method monitors the queues in the intermediate node and the target queues in other intermediate nodes, if any.

Figure 4:
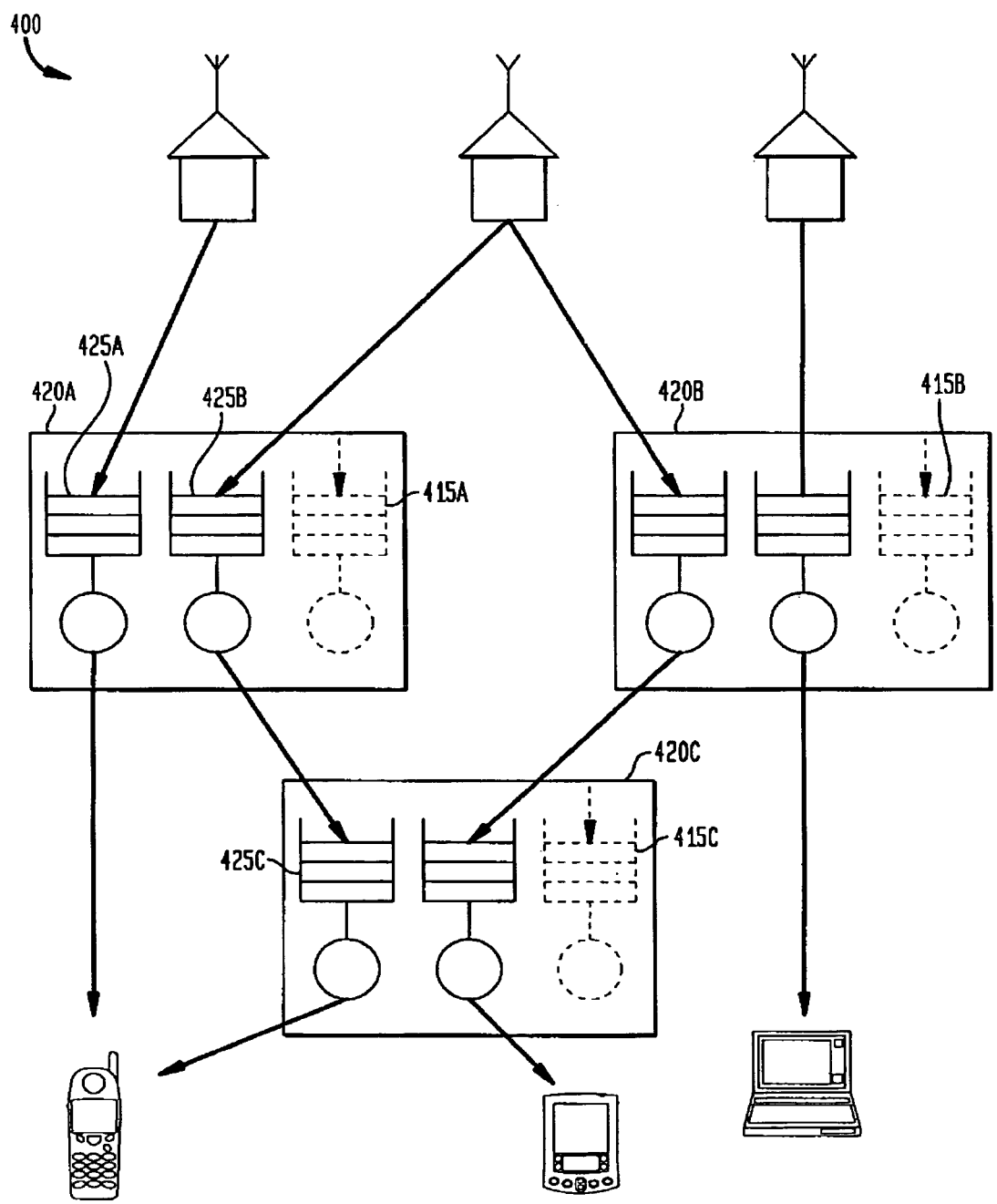
FIG. 4 illustrates of an exemplary network environment in which a second embodiment of the present invention may be advantageously employed.

FIG. 4 illustrates an exemplary network environment 400 in which the second embodiment of the present invention may be advantageously employed. The network environment 400 is similar to network environment 100 except that network environment 400 contains intermediate nodes which have to comply with certain average power usage constraints.

Intermediate nodes 420A-420C are similar to intermediate nodes 120A-120C except that intermediate nodes 420A-420C maintain virtual queues 415A-415C, respectively. As described in further detail below, a virtual queue provides a technique for an intermediate node to regulate a vector selection so that its average power usage does not exceed a fixed value. In this embodiment, the intermediate node not only chooses the service amount vectors, such as ($\mu_{425A}$, $\mu_{425B}$) corresponding to queues 425A and 425B, but also selects an amount of power $P_{420A}$ to expend servicing the queues in the timeslot. For example, intermediate node 420A would select a the tuple vector ($\mu_1$, $\mu_2$, $P_{420A}$) from a certain discrete set of available choices in order to maximize following expression, in general:

$$\sum_i [Q_i(t)\mu_i - Q_n(t)\mu_i] - Q_v(t)P \qquad (8)$$

where the terms in the summation are the same as those explained in expression (5), $Q_v(t)$ is the queue length of a virtual queue, and P is the power consumption of the intermediate node. Specifically, intermediate node 420A in network 400 selects the vector ($\mu_{425A}$, $\mu_{425B}$, $P_{420A}$) by maximizing the specific expression $$Q_{425A}(t)\mu_{425A}+Q_{425B}(t)\mu_{425B}-Q_{425C}(t)\mu_{425B}-Q_{415A}(t)P_{420A} \qquad (9)$$

where $Q_{425A}(t)$ is the queue length and $\mu_{425A}$ is the service rate of queue 425A, $Q_{425B}(t)$ is the queue length and $\mu_{425B}$ is the service rate of queue 425B, and $Q_{425C}(t)$ is the queue length of queue 425C, and $Q_{415A}(t)$ is the queue length of virtual queue 415A, and $P_{420A}$ is the power consumption of intermediate node 420A for the timeslot being evaluated.

After selecting the tuple vector ($\mu_1$, $\mu_2$, $P_{420A}$) which maximizes expression (9), an intermediate node updates the virtual queue by adding the selected $P_{420A}$ number of tokens to the virtual queue and removing a fixed number of c tokens from the virtual queue. In this manner, if $c<P_{420A}$ during a timeslot, the effects on the virtual queue include increasing its queue size. Thus, in the next timeslot, when selecting the vector, the length of the virtual queue, $Q_{415A}(t)$, will increase. A virtual queue may be implemented as a single variable in memory in which, during a timeslot, P tokens are added to the variable and c tokens are subtracted from the variable. More specifically, the queue length $Q_{415A}(t)$ may be maintained with a fixed budget constant c by either of the following two equations.

$$Q_{415A}(t+1)=\max\{Q_{415A}(t)-c,0\}+P_{420A}(t), \text{ or} \qquad (10)$$

$$Q_{415A}(t+1)=\max\{Q_{415A}(t)-c-P_{420A}(t),0\} \qquad (11)$$

A virtual queue may be applied to each node in the network including base stations. When so applied, the virtual queue also regulates selections made. In a base station or traffic source, generation rates, $\lambda_n$, and power consumption, P, are selected to maximize the following expression:

$$\sum_n [U'_n(X_n(t))\lambda_n - \beta Q_p(t)\lambda_n] - \beta Q_v P(t) \qquad (12)$$

where the summation is the same as that explained with regard to expression (2), $Q_v$ is the queue length of virtual queue v maintained by the base station and P is the power consumed in the timeslot.

It should be noted that the teachings of the present invention are not limited to their utilization in service rate selections in intermediate nodes. Other rates or service resources of an intermediate node may be selected on a timeslot basis according to the teachings of the present invention while considering power consumption constraints. Furthermore, selecting service rates while considering power consumption as taught above, allows a node to make power consumption decisions independent of the other nodes in the network. Thus, individual nodes modified according to the teachings of the invention achieve power consumption benefits regardless of whether other nodes in the communication network have been so modified.

Figure 5:
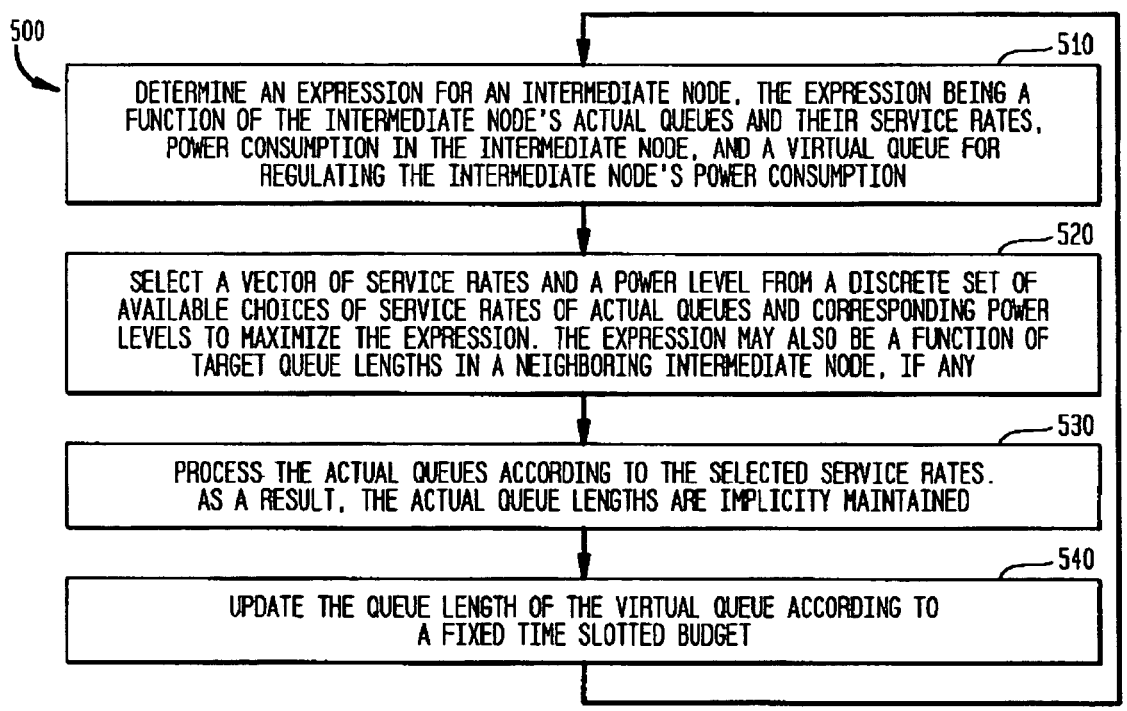
FIG. 5 is a flow chart illustrating a method of joint service rate and power consumption selection at an intermediate node in accordance with the present invention.

FIG. 5 is a flow chart illustrating a method 500 of joint service rate and power consumption selection at an intermediate node in accordance with the present invention. At step 510, an expression is determined for a intermediate node. The expression is a function of the intermediate node's actual queues and the queues' corresponding service rates, power consumption in the intermediate node, and a virtual queue for regulating power consumption in the intermediate node. At step 520, a vector of service rates and a power level from a discrete set of available choices of service rates for actual queues and power levels to maximize the expression is selected. The expression may also be a function of the queue lengths of target queues in neighboring target nodes, if any. At step 530, actual queues according to the selected service rates are processed. If the intermediate node transmits to another intermediate node, the intermediate node maintains the queue length of the target queue in the that other intermediate node which can be done by existing communication protocol handshake techniques. At step 540, the queue length of the virtual queue is updated according to a fixed time slotted budget as shown in equation (10) or (11).

Figure 6:
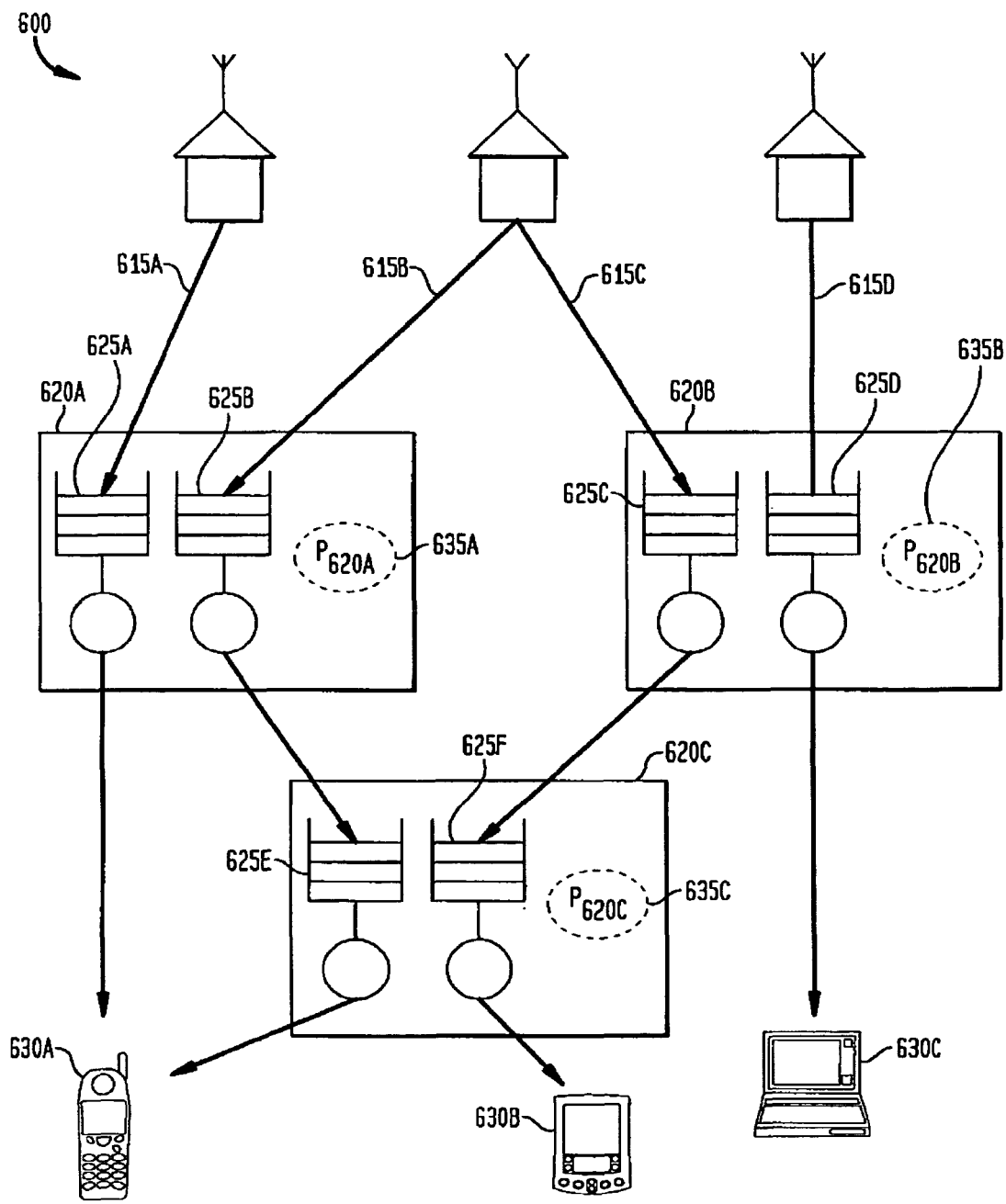
FIG. 6 illustrates an exemplary network environment in which a third embodiment of the present invention may be advantageously employed.

FIG. 6 is an illustration of an exemplary network environment 600 in which a third embodiment of the present invention may be advantageously employed. Situations may exist in a communication network where base stations do not control the traffic generation rates that they offer into the communication network. In such a situation, rather than a base station selecting the generation rates on a timeslot basis, generation rates, $\lambda_i(t)$, are some random variables. For example, traffic flows 1,2,3,4, over channels 615A-615D would have generation rates $\lambda_1(t)$, $\lambda_2(t)$, $\lambda_3(t)$, $\lambda_4(t)$, respectively, which are random variables. The intermediate nodes 620A-620C would be configured to make service rate and power consumption selections as will be described in further detail below. However, a network objective for network environment 600 is to optimize power usage throughout the communication network while keeping queues in the network stable. The network objective is then written as follows:

$$\text{maximize} \sum_i U_i(X_i) \tag{13}$$

where $U_i$ is a concave or linear utility function as a function of long term average power usage $X_i$ for node i in the network. In the embodiment depicted in FIG. 6, a virtual commodity, $P_{620A}$ for example and denoted 635A, is utilized as opposed to the virtual queue in FIG. 4 to achieve a different network objective than for the network depicted in FIG. 4. The virtual commodities $P_{620b}$, designated 635B, and $P_{620c}$, designated 635C, are employed in a similar manner. With regard to the intermediate nodes of FIG. 6, the network objective is written more specifically as $$\text{maximize } U_{620A}(X_{620A}) + U_{620B}(X_{620B}) + U_{620C}(X_{620C}) \tag{14}$$

where $U_{620A}(x)$, $U_{620a}(x)$, and $U_{620C}(x)$ are concave or linear utility functions. $X_{620A}$, $X_{620B}$, and $X_{620C}$ are long term average values of power usages, P, at intermediate nodes 620A-620C, respectively. To satisfy the objective as expressed in expression (14), the intermediate nodes 620A-620C, in general, are configured to maximize the following expression:

$$U_i'(X_i(t))P_i + \sum_q [\beta Q_q(t)\mu_q - \beta Q_n(t)\mu_q] \tag{15}$$

where i indicates a specific node, $U_1'$ is a derivative with respect to x of the configured utility function for power usage, $X_i(t)$ is the long term average power usage for node i, $P_i$ is the power used at node i in a timeslot, $\beta$ is a fixed small constant greater than zero, $Q_q(t)$ is the queue length for the queues in node i, $\mu_q$ is the service rate for queue q, $Q_n(t)$ is the queue length for the queue n which is a target of queue q, and $\mu_q$ is the service rate for queue q which transmits to queue n. In general and as a matter of terminology, $P_i$ is considered a commodity and $X_i(t)$ is considered the rate at which the commodity is produced.

Expression (15) is satisfied by intermediate nodes 620A-620C being configured to make selections of service rates for their respective queues and power savings. For example, intermediate node 620A, in a timeslot, selects service rates and power usage as a vector $(\mu_{625A}, \mu_{625B}, P_{620A})$, according to the following rule:

$$\text{maximize } U_{620A}'(X_{620A}(t))P_{620A} + \beta Q_{625A}(t)\mu_{625A} + \beta Q_{625B}(t)\mu_{625B} - \beta Q_{625E}(t)\mu_{625B} \tag{16}$$

where $U_{620A}'$ is the derivative with respect to x of the configured utility function for power consumption, $X_{620A}(t)$ is the average power consumption for node 620A, $Q_{625A}(t)$ is the queue length for the queue 625A, $Q_{625B}(t)$ is the queue length for the queue 625B, and $Q_{625E}(t)$ is the queue length for the queue 625E which is the target of queue 625B.

By way of another example, intermediate node 620B, in a timeslot, selects services rates and power usage as a vector $(\mu_{625C}, \mu_{625D}, P_{620B})$, according to the following rule:

$$\text{maximize } U_{620B}'(X_{620B}(t))P_{620B} + \beta Q_{625C}(t)\mu_{625C} + \beta Q_{625D}(t)\mu_{625D} - \beta Q_{625F}(t)\mu_{625C} \tag{17}$$

where $U_{620B}'$ is a derivative of the configured utility function for power savings, $X_{620B}(t)$ is the average power consumption for node 620B, $Q_{625C}(t)$ and $Q_{625D}(t)$ are the queue lengths for the queues 625C, 625D, respectively, and $Q_{625F}(t)$ is the queue length for the queue 625E which is the target of queue 625C.

Intermediate node 620C, in a timeslot, selects service rates and power savings as a vector $(\mu_{625E}, \mu_{625F}, P_{620C})$, according to the following rule:

$$\text{maximize } U_{620C}'(X_{620C}(t))P_{620C} + \beta Q_{625E}(t)\mu_{625E} + \beta Q_{625F}(t)\mu_{625F} \tag{18}$$

where $U_{620C}'$ is the derivative with respect to x of the configured utility function for power usage, $X_{620C}(t)$ is the average power usage for node 620C, $\beta$ is a fixed small constant greater than zero, $Q_{625E}(t)$ and $Q_{625F}(t)$ are the queue lengths for the queues 625E and 625F, respectively. After the vector selection of service rates and power usage, intermediate nodes 620A-620C update their corresponding average power usage estimates as follows:

$$X_i(t+1) = \beta P_i(t) + (1-\beta)X_i(t) \tag{19}$$

where i corresponds to intermediate nodes 620A, 620B, and 620C.

Configuring the intermediate nodes 620A, 620B, and 620C according to expression (16), (17), and (18), respectively, advantageously provides the flexibility for each node to generate controls where each intermediate node has a different utility function. For example, the utility function for a first intermediate node may be $U(x)=-x^2$. For second intermediate node, the utility function may be $U(x)=-x$. For these exemplary utility functions, it is apparent that the power savings in the first intermediate node is more important from the network point of view than the power savings in the second intermediate node.

Referring to expression (14), a special case results when the utility functions for all the nodes are equal to $-x$. For example, $U_{620A}(x)=-x$, $U_{620B}(x)=-x$, and $U_{620C}(x)=-x$ where x is the long term average power consumption. This typical situation arises, for example, when total average power consumption at all nodes in a network is to be minimized. Applying expression (14), intermediate nodes would select service rates so that the following system objective is reached:

$$\text{maximize } (-X_{420A})+(-X_{420B})+(-X_{420C}) \quad (20)$$

For clarification purposes, we can similarly rewrite expression (20) as follows:

$$\text{minimize } X_{420A}+X_{420B}+X_{420C} \quad (21)$$

The network objective, then, is to minimize the power usage by all intermediate nodes 420A-420C. Referring back to expression (15) and taking derivatives of utility function, the derivative term of expression (15), would yield the constant $-1$, regardless of any particular value of x. As a result, for this special case, there is no need to keep track of long term average power consumption, $X_{620A}$, $X_{620B}$, and $X_{620C}$. The rules, then, for intermediate nodes to make choices as stated in expressions (16), (17), and (18) may be simplified to the following rules for selecting service rates and power consumption of intermediate nodes 620A-620C:

$$\text{maximize } -P_{620A}+\beta Q_{625A}(t)\mu_{625A}+\beta Q_{625B}(t)\mu_{625B}-\beta Q_{625E}(t)\mu_{625B} \quad (22)$$

$$\text{maximize } -P_{620B}+\beta Q_{625C}(t)\mu_{625C}+\beta Q_{625D}(t)\mu_{625D}-\beta Q_{625F}(t)\mu_{625C} \quad (23)$$

$$\text{maximize } -P_{620C}+\beta Q_{625E}(t)\mu_{625E}+\beta Q_{625F}(t)\mu_{625F} \quad (24)$$

The aforementioned technique applied to nodes 620A-620C in this special situation minimizes the power consumption by nodes 620A-620C. Utilizing this advantageous technique results in an intermediate node not needing to know the power consumption of other nodes and not having to track their own long term power consumption average. In fact, the scenario when all nodes use $U(x)=-x$ is typical when average power consumption is to be minimized at all nodes in a network.

Figure 7:
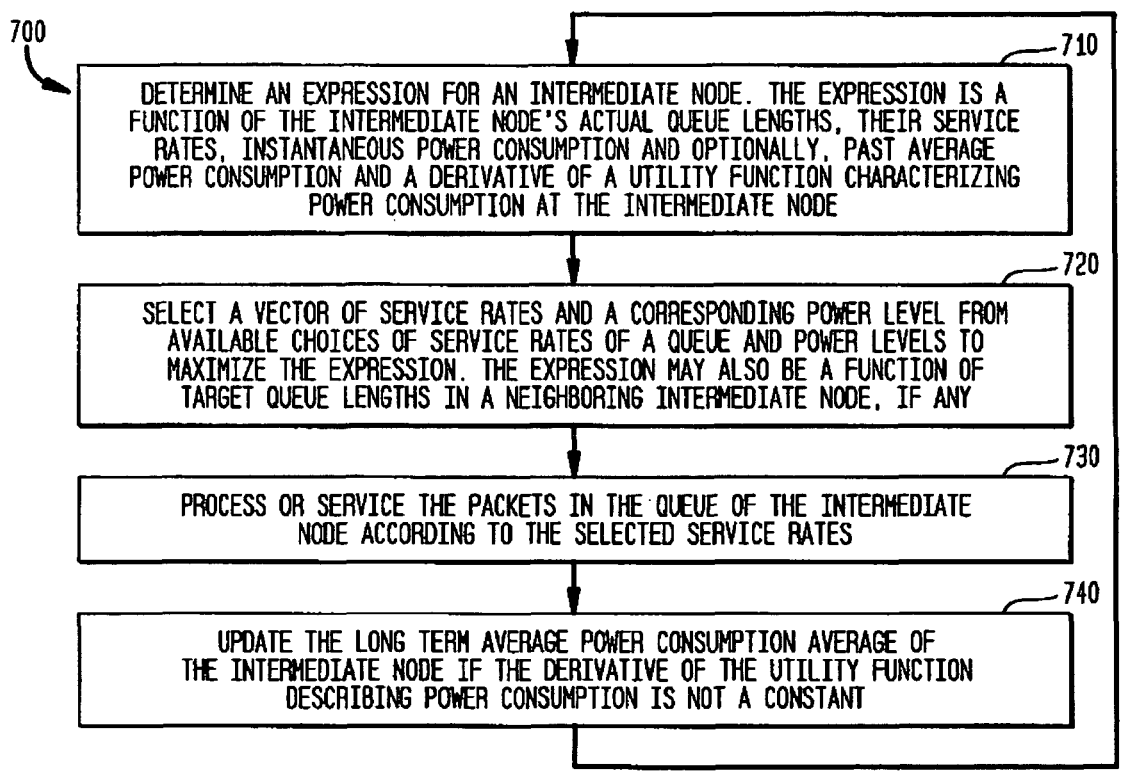
FIG. 7 is a flow chart illustrating a method of joint service rate and power consumption selection at a network node to reduce network power consumption in accordance with the present invention.

FIG. 7 is a flow chart illustrating a method 700 of a joint service rate and power consumption selection at an intermediate node to minimize power consumption in accordance with the present invention. At step 710, an expression for the intermediate node is determined. The expression is a function of the intermediate node's actual queue lengths, their corresponding service rates, and instantaneous power consumption. Optionally, the expression may also be a function of the intermediate node's past average power consumption and a derivative of a utility function assigned to the network node. The utility function is a function of long term average power consumption. Furthermore, the utility function may be concave or linear.

At step 720, a vector of service rates and a corresponding power level from a discrete set of available choices of service rates of actual queues and power levels is selected to maximize the expression. The expression may also be a function of queue lengths of a target queue in a neighboring intermediate node, if any. At step 730, the actual queues of the network node are serviced according to the selected service rates. As a result, the queue lengths of the actual queues are updated. If the intermediate node transmits to a second intermediate node, the network node maintains the queue length of the target queue in the second intermediate node. This transmission can be accomplished utilizing existing communication protocol handshake techniques. At optional step 740, the long term average power consumption of the intermediate node is updated if the derivative of the utility function describing power consumption is not constant.

While the present invention has been disclosed in the context of various aspects of node's control actions performed by network nodes such as selecting generation rates, service rates and power consumption, utilizing virtual commodities and virtual queues, it will be recognized that the invention may be suitably applied to other system control objectives and constraints such as upper and lower bounds of traffic generation rates, and the like. To support all such system objectives and constraints, expressions (2) and (4) can be generalized respectively as choosing in a timeslot t a network control action $$k(t) \in \arg_k \max \sum_{n \in N^\mu} (\partial H(X(t))/\partial X_n) b_n(k) - \sum_{n \in N^P} \beta Q_n(t) \overline{\Delta Q_n}(k), \quad (25)$$

where k represents a network control action from a discrete set available in slot t, $\beta>0$ is a typically small parameter, and $X(t)$ is the vector of the current averages of commodity rates, updated as follows:

$$X_n(t+1)=X_n(t)+\beta(b_n(k(t))-X_n(t)), n \in N^u. \quad (26)$$

In expression (26), $^u$ represents a finite set of generated commodity flows. $H(X)$ is a concave utility function of the vector X of average commodity rates. $b_n(k)$ is the amount of commodity that is generated by control action k. $^P$ represents a finite set of processing nodes having queues. $Q_n(t)$ are the queue lengths of processing nodes n. $\overline{\Delta Q_n}(k)$ is the expected average increment, or drift, of the queue length $Q_n$ at a processing node $n \in {}^P$ caused by control k, calculated under the assumption that all $Q_n$ at all processing nodes were large enough for queues to not empty as a result of control k.

Using natural vector notation, and "·" to denote scalar products, expression (25) can be concisely written as follows:

$$k(t) \in \arg_k \max \nabla H(X(t)) \cdot b(k) - \beta Q(t) \cdot \overline{\Delta Q}(k) \quad (27)$$

I claim:
1. A method, comprising:
   setting a new network traffic service rate to be provided for traffic passing into and out of one or more queues of a router and a new power consumption level for the router, said one or more queues being configured to store data packets awaiting transmission from the router, the step of setting being based on a service rate of the one or more queues and a power consumption level of the router; and
   resetting a new network traffic service rate for traffic passing into and out of the one or more queues of the router and a new power consumption level of the router, the step of resetting being based on a service rate of the one or more queues and a power consumption level of the router; and wherein the step of setting and the step of resetting are based differently on the power consumption level of the router; and wherein the step of setting and the step of resetting are based on an instantaneous power usage rate in said router; and wherein the step of setting includes selecting a vector from a set, the vector defining a service rate for the one or more queues of the router and a power consumption level of the router.

2. The method of claim 1, wherein the selecting step includes comparing values of an expression for different ones of the vectors of the set.

3. The method of claim 2, wherein the step of resetting includes selecting another vector from the set, the selecting another vector including comparing values of an expression for different ones of the vectors of the set.

4. The method of claim 2, wherein the expression depends linearly on the service rate for each queue of the router.

5. The method of claim 1, further comprising:
receiving at the router a value of a length of a queue in a network node, the network node being configured to store data packets received from the router in the queue in the network node.

6. The method of claim 5, wherein both the step of setting and the step of resetting are based in part on the length.

* * * * *